(12) United States Patent
Espinosa

(10) Patent No.: US 8,402,775 B2
(45) Date of Patent: *Mar. 26, 2013

(54) VACUUM STORAGE APPARATUS WITH SLIDING DRAWERS

(75) Inventor: Edward P. Espinosa, Madrid (ES)

(73) Assignee: Jeffrey S. Melcher, Boca Raton, FL (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/985,381

(22) Filed: Jan. 6, 2011

(65) Prior Publication Data

US 2011/0094190 A1    Apr. 28, 2011

Related U.S. Application Data

(63) Continuation of application No. 11/939,076, filed on Nov. 13, 2007, now Pat. No. 7,895,848, which is a continuation of application No. 11/048,141, filed on Feb. 1, 2005, now Pat. No. 7,325,409.

(60) Provisional application No. 60/555,991, filed on Mar. 24, 2004.

(51) Int. Cl.
 *F24F 3/16* (2006.01)

(52) U.S. Cl. ............................... 62/78; 62/268

(58) Field of Classification Search ............ 62/78, 169, 62/268, 100, 270, 441, 176.1; 53/86, 434
See application file for complete search history.

(56) References Cited

U.S. PATENT DOCUMENTS

| | | | |
|---|---|---|---|
| 1,404,400 A | 1/1922 | Moon | |
| 1,594,512 A | 8/1926 | von der Lippe-Lipski | |
| 2,388,746 A | 11/1945 | Knapp | |
| 2,425,816 A | 8/1947 | Maxson | |
| 2,823,833 A * | 2/1958 | Bauerlein | 222/129.2 |
| 2,894,845 A | 7/1959 | Stoddard | |
| 3,116,610 A | 1/1964 | Whitmore | |
| 3,216,214 A | 11/1965 | Gasbarro | |
| 4,222,276 A * | 9/1980 | DeRogatis | 73/714 |
| 4,557,118 A | 12/1985 | Pink | |
| 4,841,661 A * | 6/1989 | Moore | 43/54.1 |
| 4,909,014 A | 3/1990 | Kobayashi | |
| 5,046,332 A | 9/1991 | Hermann | |
| 5,095,717 A * | 3/1992 | Germi | 62/382 |
| D326,663 S | 6/1992 | Kim | |
| 5,136,853 A | 8/1992 | Girardon | |
| 5,142,970 A | 9/1992 | ErkenBrack | |
| 5,157,940 A | 10/1992 | Bertu | |
| 5,195,427 A | 3/1993 | Germano | |
| 5,271,240 A * | 12/1993 | Detrick et al. | 62/268 |
| 5,332,095 A * | 7/1994 | Wu | 206/524.8 |
| 5,347,918 A | 9/1994 | Chen | |
| 5,390,809 A * | 2/1995 | Lin | 220/212 |
| 5,398,811 A * | 3/1995 | Latella, Jr. | 206/524.8 |
| 5,494,165 A | 2/1996 | Detrick | |

(Continued)

FOREIGN PATENT DOCUMENTS

| | | |
|---|---|---|
| DE | 19858254 A1 | 6/2000 |
| DE | 202004011287 U1 | 9/2004 |

(Continued)

OTHER PUBLICATIONS

European Search Report and Examination mailed Feb. 20, 2012 in EP 06 72 0029.

(Continued)

*Primary Examiner* — Mohammad Ali
(74) *Attorney, Agent, or Firm* — Jeffrey S. Melcher; Manelli Selter PLLC

(57) ABSTRACT

Provided is a modular vacuum storage apparatus and method for storing, dispensing, preserving and shipping perishable items.

25 Claims, 4 Drawing Sheets

U.S. PATENT DOCUMENTS

| | | |
|---|---|---|
| 5,522,216 A | 6/1996 | Park |
| 5,605,047 A | 2/1997 | Park |
| 5,806,575 A | 9/1998 | Tsay |
| 5,946,919 A | 9/1999 | McKinney |
| 5,964,255 A | 10/1999 | Schmidt |
| 6,090,422 A | 7/2000 | Taragan |
| 6,148,875 A | 11/2000 | Breen |
| 6,264,054 B1 * | 7/2001 | Miyake et al. ............. 220/23.83 |
| 6,510,946 B2 * | 1/2003 | Gutierrez et al. ............. 206/545 |
| 6,904,761 B2 | 6/2005 | Rafalovich |
| 6,971,418 B2 | 12/2005 | De Costa |
| 7,048,136 B2 | 5/2006 | Havens |
| 2003/0024278 A1 | 2/2003 | Berkey |
| 2007/0234754 A1 | 10/2007 | Pimputkar et al. |
| 2008/0006041 A1 | 1/2008 | Nakata |

FOREIGN PATENT DOCUMENTS

| | | |
|---|---|---|
| EP | 0405680 A2 | 1/1991 |
| EP | 0440296 A1 | 8/1991 |
| EP | 0545246 A2 | 6/1993 |
| JP | 2000-2479 A1 | 1/2000 |
| JP | 2001-013837 | 1/2001 |
| JP | 2004085004 A | 3/2004 |
| WO | 90/13779 A1 | 11/1990 |
| WO | 96/31746 A1 | 10/1996 |
| WO | 01/71263 A1 | 9/2001 |
| WO | 2005/057103 | 6/2005 |

OTHER PUBLICATIONS

Final Office Action mailed Feb. 2, 2011, in U.S. Appl. No. 12/026,870.

* cited by examiner

VACUUM STORAGE APPARATUS WITH SLIDING DRAWERS

This application is a continuation of U.S. patent application Ser. No. 11/939,076, filed 13 Nov. 2007, which is continuation of U.S. application Ser. No. 11/048,141, filed 1 Feb. 2005, now U.S. Pat. No. 7,325,409, issued 5 Feb. 2008. This application also claims priority to U.S. Provisional Patent Application Ser. No. 60/555,991, filed on 24 Mar. 2004, abandoned. The complete disclosures of these applications are incorporated herein by reference.

FIELD OF THE INVENTION

The invention relates to storing perishable foods and goods and, more particularly, to a modular vacuum storage apparatus and method for storing, dispensing, preserving and shipping perishable items.

BACKGROUND OF THE INVENTION

Removing heat from perishable foods and goods prior to storing or shipping them is a well-known technique with proven efficacy. Perishable goods are now stored or shipped routinely in all parts of the world. These measures can be enhanced by modifying and monitoring not only temperature, but also vacuum, humidity and gas mix levels in the surrounding food storage environment.

U.S. Pat. No. 5,946,919, issued to McKinney, et al., for FOOD CONSERVATOR SYSTEM on Sep. 7, 1999, discloses a single vacuum compartment appropriate for storing baked goods, in which a negative pressure of 10" Hg is maintained and wherein a humidity level of "at least about" 60% relative humidity is maintained. The environment of the compartment is feedback-controlled by a microprocessor. The microprocessor can control vacuum, relative humidity, temperature, the amount of ozone introduced into the compartment to retard bacterial growth, as well as, out-gassing time cycles. A menu allows a user to input data used to control the microprocessor, and permit optimization of the compartment environment for the particular foodstuffs presently being stored.

McKINNEY, et al., can include an ozone ultraviolet generator, a humidifier unit, and/or an activated charcoal chamber. Generating ozone and ultraviolet radiation helps retard or kill mold spores and other undesired components that may be present. The inclusion of an activated charcoal chamber helps further combat odors and removes carbon dioxide by-products.

The enclosure or compartment of McKINNEY, et al., however, has no mechanism for separating foodstuff or for accessing certain perishable items without accessing all of them. This is a serious drawback, as the vacuum is released when the front door is opened. Moreover, the temperature of all remaining perishable items is affected by the door opening in order to access other items or insert them into the container. Likewise, humidity is affected by such actions.

It would be advantageous to provide a perishable food and goods storage system capable of maintaining multiple compartments at predetermined vacuum, temperature, humidity and gas mix levels.

It would also be advantageous to provide a storage system that could accommodate a plurality of perishable foodstuff.

It would further be advantageous to provide a storage system that has a number of individually movable, modular drawers, each drawer being capable of holding different items.

It would still further be advantageous to provide a storage system with individual, movable, modular drawers with a single environmental control unit for the entire system.

It would still be further advantageous to provide a storage and dispensing system that uses one-way valve (or similar functioning mechanism) containers and/or bags to store, preserve and dispense items.

It would still be further advantageous to provide a system that automatically creates, maintains and releases various environments in respective storage units by modifying parameters such as: temperature, humidity, vacuum and gas mix levels and combinations thereof.

It would also be advantageous to program the apparatus to automatically turn off a particular operating system during peak usage to conserve electricity or for operation during specific time periods and intervals.

SUMMARY OF THE INVENTION

In accordance with the present invention, there is provided an apparatus for storing, preserving and dispensing perishable and degradable food, goods and materials for residential, commercial, and industrial applications. A rigid housing is provided, in which at least one modular unit is disposed. Physically removed from the modular unit is a vacuum pump for creating a partial vacuum environment. Optionally provided are operating systems to create, monitor, and maintain: temperature, humidity, and gas mix levels in the storage unit.

In the preferred embodiment, the modular unit is a slidable drawer. Moreover, more than one drawer can be provided, each drawer stacked above one another and all of the drawers being operatively connected to the vacuum pump and optionally to the temperature and humidity control device and the gas sourcing system.

The modular units can be either storage or processing units. The processing unit is designed to create a partial vacuum in one-way valve or similar functioning bags and containers placed into the unit.

The apparatus housings include closed and open frames and/or rack systems to hold single or multiple modular units. The modular units are standardized in size and coupling in order to allow the units to be moved from one housing to another. When a unit is removed from a closed housing another unit can replace it, or a cover can be placed into the housing opening to seal it. The removed modular units can be connected to portable operating systems and can be disposed side-by-side, like books on a shelf; or vertically stacked, like drawers in a dresser.

Furthermore, an apparatus can consist of a combination of processing and/or storage units and a closed housing can provide said units with or without a range of temperature.

BRIEF DESCRIPTION OF THE DRAWINGS

A complete understanding of the present invention may be obtained by reference to the accompanying drawings, when considered in conjunction with the subsequent detailed description in which.

DESCRIPTION OF THE PREFERRED EMBODIMENT

The invention can substantially extend the shelf-life, freshness and quality of a wide range of perishable and degradable items by controlling and/or eliminating their exposure to oxidation, moisture, insects, spoilage bacteria and other organic and non-organic chemical reactions that degrade items and accelerate ripening and decay.

The invention features a modular apparatus for storing, preserving and dispensing perishable and degradable food and goods. A rigid housing is provided, in which at least one modular unit is disposed. Physically removed from the modular unit is a vacuum pump for creating a partial vacuum; a temperature control unit for creating and maintaining a range of temperature (for closed housings); a humidity control unit for maintaining or modifying the humidity level; and a gas sourcing system for introducing and modifying the gas mix levels in each modular unit.

The apparatus offers a combination of unit environment settings applicable to preserve a wide range of perishable items. Multiple, independent and sealable drawers each have unique, preset storage environments depending upon use requirements. Each storage unit is engineered to store and preserve a particular type of perishable or degradable item. For example, food groups can consist of, but are not limited to: (1) breads and pastries; (2) dry goods (e.g., cereals, grains, herbs, coffee, etc.; (3) fruit; (4) vegetables; (5) meats; and (6) cheeses.

Figure 2:
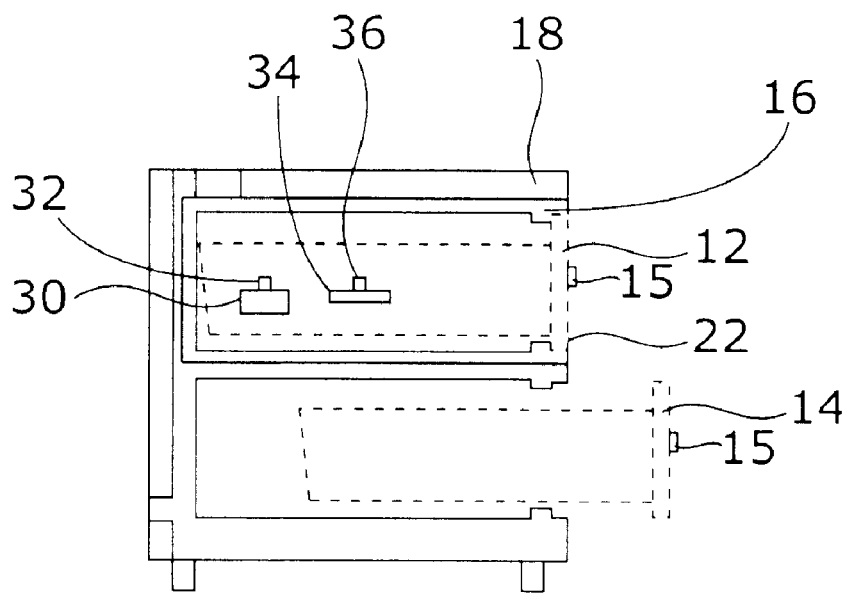
FIG. 2 is a side, cross section view of one embodiment of the invention.

The container processing unit is a modular unit designed to create a partial vacuum in one-way valve bags 34 and containers 30 (or variations thereof) to preserve the contents therein yet still store perishable items, as shown in FIG. 2. The one-way valves are shown at 32 for the container 30 and at 36 for bag 34.

When a processing unit is closed and sealed with a container inside, a sufficient preset partial vacuum is created within the processing unit, to in turn, create a partial vacuum environment within each respective container placed into the processing unit. When the processing unit is opened, the partial vacuum therein is automatically released; however, each processed container maintains its unique storage environment. The containers can then be inventoried either in the processing unit in a storage unit, or in other storage areas (e.g., the refrigerator, pantry, etc.).

The method for storing, preserving, and dispensing perishable and degradable food and goods consists of the following steps. The operator places the items to be preserved or stored into a one-way valve (or similar functioning mechanism) container or bag (or variation thereof) and then closes and seals the container or bag. The operator then places the bag or container into the processing unit and then closes and seals the processing unit. The processing unit then creates a sufficient vacuum environment within the unit, to in turn, create a partial vacuum within each one-way valve container or bag in the processing unit. When the processing unit is opened and the partial vacuum is released, each bag or container retains its unique storage environment until the bag or container is opened. Single or multiple bags and containers can be processed simultaneously. This method is applicable to any compartment or space that can create a vacuum or partial vacuum.

The inventive apparatus is scalable. In the preferred embodiment the apparatus consists of single or multiple independent, sealable processing and/or storage units that operate mechanically as drawers. Each unit is affixed into an insulated housing in which a temperature control system circulates air around the respective unit. In alternate embodiments, each unit can be removed from its respective housing, while retaining its sealed environment, and can stand alone, be placed in another housing or can be connected to portable humidity, vacuum and gas operating systems.

The units can be vertically or horizontally attached to other units using interlocking mechanisms. The apparatus' components, housings, modular units, and operating systems can be standardized and interchangeable.

Each processing and storage unit consists of preset and independent environments that are controlled, monitored and maintained by a centralized, preset programmable, microprocessing unit (CPU). The CPU communicates with the operating systems and the sensors and controls in each respective modular unit to create unique partial vacuum storage environments that may be modified by humidity, gas sourcing and temperature systems.

Operating systems are located outside of the respective storage unit environment. Each operating system connects to the CPU and the respective storage unit. The operating systems consist of a commonly shared vacuum pump and optionally a combination of any of the following: temperature control system (in the closed housing), relative humidity system, and gas sourcing system. The operating systems can also include ozone, filtration systems (e.g., activated charcoal) and any other systems to minimize odor and control bacterial growth.

Figure 1:
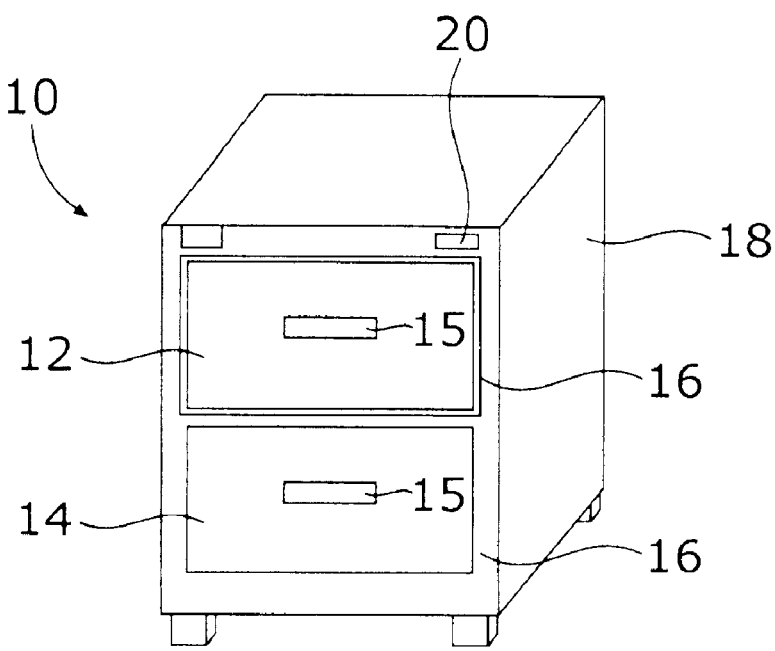
FIG. 1 is a perspective view of the apparatus in accordance with the invention.

Referring now to FIG. 1, the preferred embodiment contemplates single or multiple drawers, and here is shown a vacuum storage apparatus 10 with two slidable drawers 12, 14, each having a handle/latch mechanism 15, in a sealable storage unit 16 that is affixed to an insulated rigid housing 18. At least one of the drawers 12, 14 is slidable and can be removed from the storage unit 16. Air is circulated around each storage unit 16 in the housing 18 with the respective functions controlled and monitored by sensors 50 (FIG. 3) via a control panel 20. In this embodiment, the modular unit described above comprises the storage unit 16 containing the drawer 14.

Referring now to FIG. 2, when a storage unit 16, shown having a drawer 12 to provide a sealed space, is removed (shown in FIG. 4), a created environment within the storage unit 16 and drawer can be maintained. In this embodiment, the modular unit described above comprises the storage unit 16 containing the drawer 12. The drawer 14 is shown in FIG. 2 as being sealed within the rigid housing 18 and not within a storage unit 16 and, thus, in this embodiment, the modular unit described above comprises the drawer 14 without a storage unit 16. Furthermore, the storage unit 16 can be placed into other rigid housings such as closed or open frames and rack systems or function independently of any housing. The storage unit 16 when removed from its rigid housing can be vertically and/or horizontally stacked and connected to portable vacuum, gas sourcing and humidity operating systems. The storage unit 16 is removed from or replaced into the rigid housing 18 by use of manual connection fittings and retractable operating system lines for the respective storage unit functions (vacuum, humidity, gas mix and control panel), in a manner well known in the art.

Figure 4:
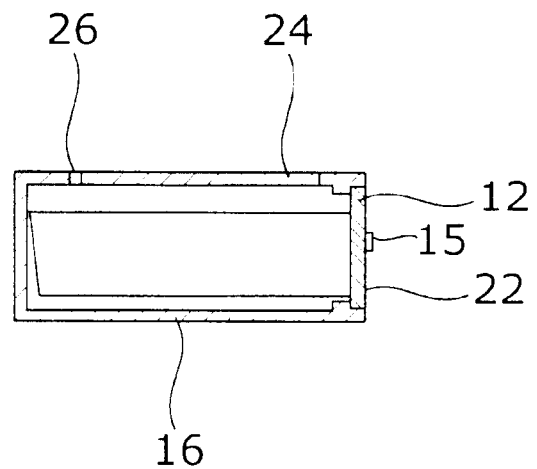
FIG. 4 is a side, cross section view of a modular unit shown in FIG. 2 removed from the rigid housing.

A hinged door 22 can optionally be provided to seal the housing 18 holding the storage unit 16 to maintain the temperature for the housing and unit, which is shown in FIG. 4.

Storage unit 16 can also include a removable or hinged top 24 (shown in FIG. 4) that opens and closes the storage space. When the lid 24 is closed, a seal, not shown, allows a partial vacuum to be created. When the lid 24 is opened, to add or remove items, the vacuum environment is released. The removable or hinged top 24 can also include latches 26 (shown in FIG. 4).

Figure 3:
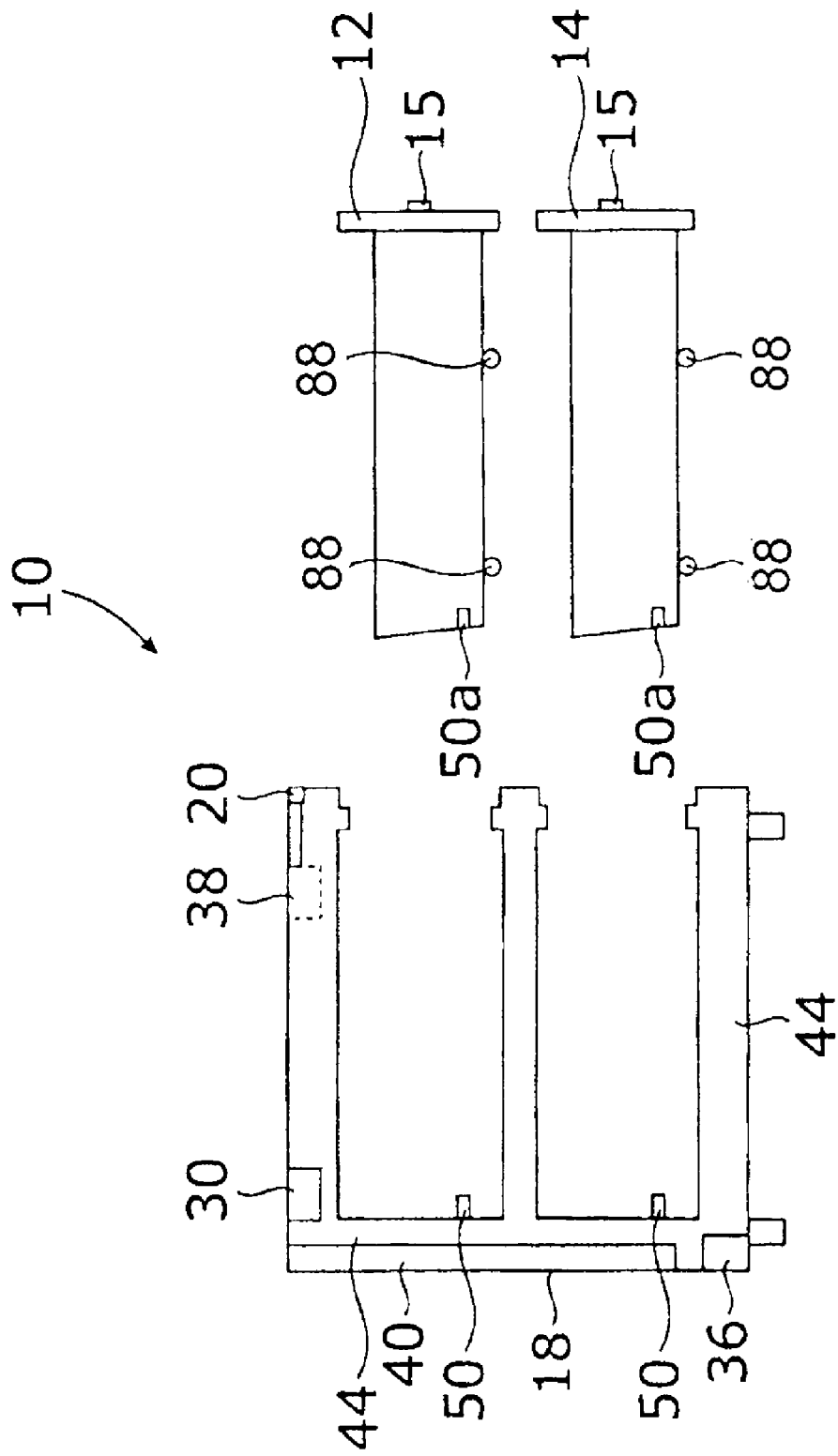
FIG. 3 is a side, cross section view of an alternate embodiment of the invention.

Referring now to FIG. 3, there is shown the apparatus 10 with drawers 12, 14 removed from housing 18. A well or reservoir 30 is provided with a suitable lid, not shown, for receiving water for use by a humidifier, not shown, operatively connected to or in housing 18. Rollers 88 are rotatably affixed to the lower portion of each drawer 12, 14 or into housing 18 to facilitate sliding thereof. In this embodiment, the modular unit described above comprises the drawers 12 and 14 without the use of storage unit 16.

Also integral with housing 18 is a vacuum pump 36, electrically operated under control of a microprocessor 38 and display panel 20. A hot/cold temperature control subsystem 40 is disposed at the rear of housing 18 and, again, operated under control of a microprocessor 38 and display panel 20. A humidity line 44 is attached to each respective drawer 12, 14 when seated in housing 18 to create and maintain the desired level or range of humidity therein.

Temperature, vacuum, gas mix and humidity sensors 50 are provided for each storage unit 12, 14 supported by housing 18. The bank of sensors 50 is electrically connected to microprocessor 38. In the preferred embodiment, sensors 50 are also connected to suitable valves and couplings that mate with respective sockets 50*a* on the rear portions of drawers 12, 14. Other configurations of sockets, sensors, valves and couplings can also be devised, depending upon the preferences and goals of the manufacturer.

Figure 5:
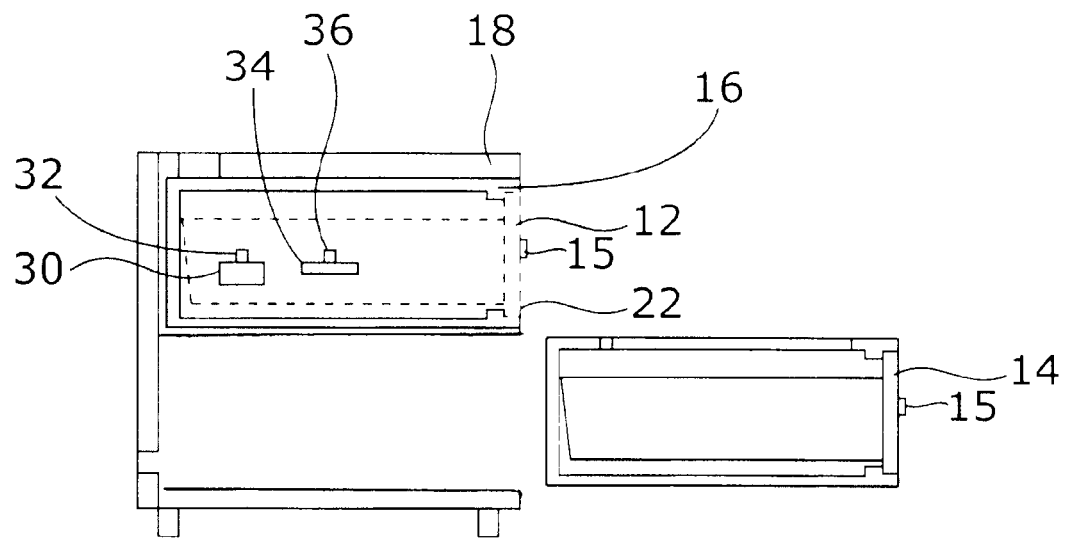
FIG. 5 is a side, cross section view of an alternate embodiment of the invention.
Figure 6:
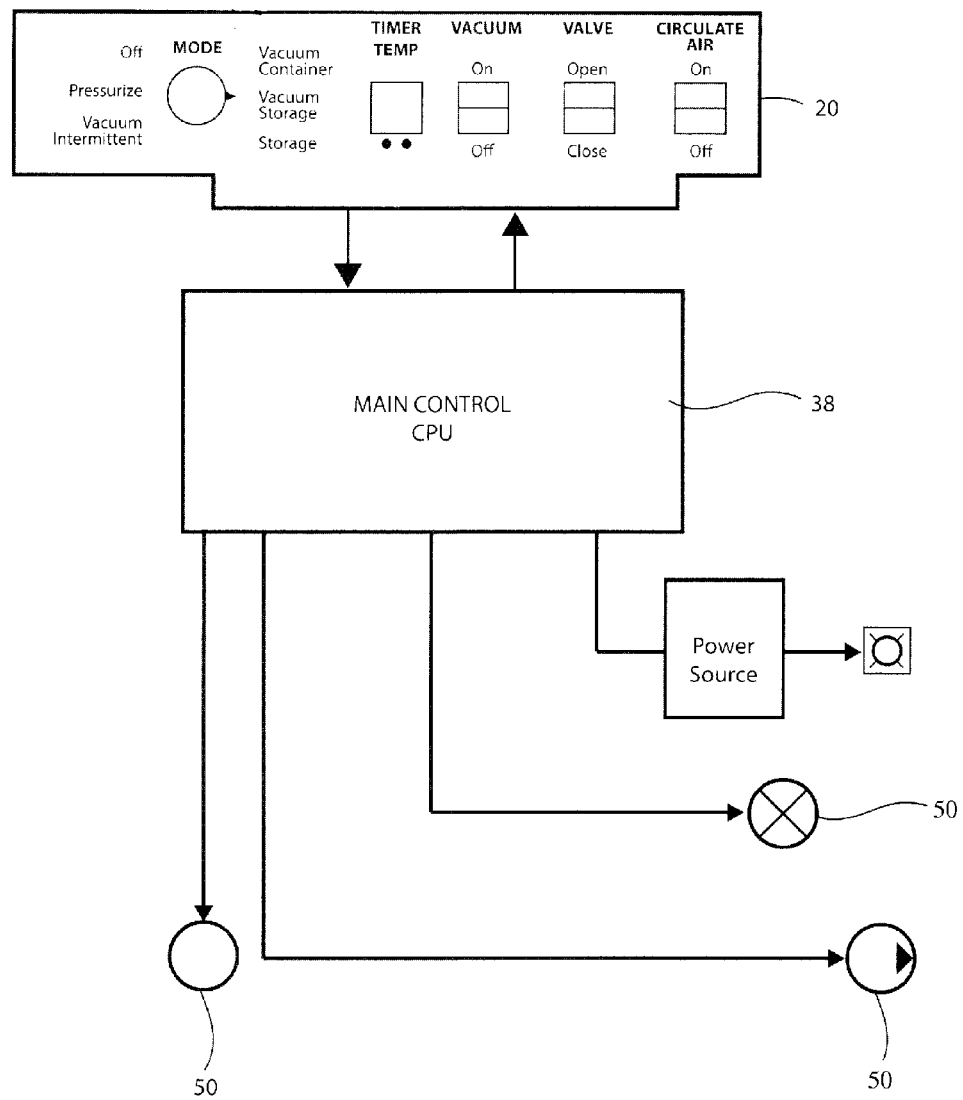
FIG. 6 illustrates a control panel having a display panel and microprocessing unit connected to sensors.

FIG. 4 illustrates the modular unit comprising a storage unit 16 (also shown in FIG. 2) removed from the rigid housing (shown at 18 in FIG. 2). The storage unit 16 is shown with the optional hinged top 24 and latches 26. FIG. 5 illustrates the storage unit 16 in relation to the housing 18.

Since other modifications and changes can vary to fit particular operating requirements and environments and will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for storing, preserving and dispensing perishable and degradable food and goods comprising:
    a) at least one modular unit comprising a storage unit for holding items, having a top, further comprising at least one container or bag inside the modular unit, the container or bag having a one-way valve wherein when a partial vacuum is created inside the modular unit a partial vacuum is also created inside each independently sealed one-way valve container or bag therein;
    b) means operatively connected to, but physically removed from, said modular unit for creating a partial vacuum inside the modular unit and inside each one-way valve container or bag therein;
    c) means for sealing and maintaining said partial vacuum inside the modular unit; and
    d) the modular unit and each one-way valve container and bag being constructed and arranged wherein when the partial vacuum, or part thereof, is released from inside the modular unit a partial vacuum is retained inside each independently sealed one-way valve container or bag therein.

2. The apparatus for storing, preserving and dispensing perishable and degradable food and goods according to claim 1, further comprising means operatively connected to, but physically removed from, said modular unit for creating and maintaining a range of humidity in the modular unit.

3. The apparatus for storing, preserving and dispensing perishable and degradable food and goods according to claim 1, wherein said apparatus is a compartment of a refrigerator.

4. The apparatus according to claim 1, further comprising a control system connected to the modular unit.

5. The apparatus according to claim 4, wherein the control system is constructed to automatically regulate the temperature in the modular unit.

6. The apparatus according to claim 4, wherein the control system is constructed to automatically control the humidity in the modular unit.

7. The apparatus according to claim 4, further comprising a display panel connected to the control system.

8. The apparatus according to claim 4, wherein the control system is configured to automatically create, maintain or release the partial vacuum inside the modular unit.

9. The apparatus according to claim 8, further comprising a valve connected to the modular unit and to the means for creating a partial vacuum to control the partial vacuum inside the modular unit.

10. A method for storing, preserving and dispensing perishable and degradable food and goods comprising the following steps:
    a) placing items into at least one one-way valve container or bag and closing and sealing said container or bag, said sealed, one-way valve container or bag being disposed in an open drawer within a modular unit;
    b) closing the drawer to seal said modular unit with said sealed one-way valve container or bag inside the drawer;
    c) actuating a vacuum means to create a partial vacuum environment inside the drawer, to in turn, create a partial vacuum environment inside each sealed one-way valve container or bag placed therein; and
    d) when the partial vacuum, or part thereof, is released from inside the drawer unit a partial vacuum is retained inside each independently sealed one-way valve container or bag therein.

11. The method according to claim 10, further comprising using a control panel to activate the vacuum means.

12. The method according to claim 11, further comprising a vacuum sensor connected to the modular unit, the vacuum means and the control panel, the method further comprising using the control panel and vacuum sensor for controlling, monitoring and indicating a level of vacuum inside the modular storage unit.

13. A method for storing, preserving and dispensing perishable and degradable food and goods in a vacuum storage system including a modular storage unit and a slidable drawer to open and close said modular unit, comprising the following steps:
    a) placing one or more containers or bags each having a one-way evacuation valve into a modular unit;
    b) closing and sealing the drawer in said modular unit;
    c) actuating through a control panel a vacuum means in communication with the storage unit to create a partial vacuum within the storage unit space, wherein a partial vacuum environment is simultaneously created in the one or more containers or bags via respective one-way evacuation valves; and d) automatically deactivating the vacuum means through said control panel upon creating a partial vacuum within the modular storage unit to allow the pressure within the storage space to increase while the one or more containers or bags maintain said partial vacuum environments.

14. The method according to claim 13, further comprising a valve in communication with the storage space to automatically return the modular storage unit space to atmospheric pressure after a partial vacuum is created.

15. The method according to claim 13, further comprising a vacuum sensor connected to the modular unit, the vacuum means and the control panel, the method further comprising using the control panel and vacuum sensor for controlling, monitoring and indicating a level of vacuum inside the modular storage unit.

16. The apparatus according to claim 13, wherein said apparatus is a compartment of a refrigerator.

17. An apparatus for storing, preserving and dispensing perishable and degradable food and goods comprising:
    a) a modular unit;
    b) a slidable drawer constructed to open and close said modular unit;
    c) one or more vacuum sealing containers or bags each provided with a one-way evacuation valve;
    d) a vacuum means in communication with the storage space in the modular unit to create a partial vacuum within the storage space when said vacuum means is actuated;
    e) a control panel connected to the vacuum means for creating a partial vacuum through activation of the vacuum means wherein, upon placing the one or more vacuum sealing containers or bags in the modular unit and actuating the vacuum means using the control panel, a partial vacuum is created in the storage space simultaneously creating a partial vacuum in the one or more vacuum sealing containers or bags, whereupon the control panel automatically deactivates the vacuum means upon creating a partial vacuum within the modular unit and allowing the pressure in the modular storage unit space to increase while the vacuum sealing containers or bags maintain a partial vacuum environment; and
    f) a valve in communication with the storage space automatically returning the modular storage unit space to atmospheric pressure after a partial vacuum is created.

18. The apparatus according to claim 17, further comprising a vacuum sensor connected to the modular unit, the vacuum means and the control panel to control, monitor and indicate a level of vacuum inside the modular storage unit.

19. The apparatus according to claim 17, wherein said apparatus is a compartment of a refrigerator.

20. A compartment for storing, preserving and dispensing perishable and degradable food and goods comprising:
    a) a modular unit;
    b) a slidable drawer constructed to open and close said modular unit;
    c) a vacuum means in communication with the modular unit;
    d) a control panel operable to activate the vacuum means and initiate the evacuation event; and
    e) at least one removable container or bag disposed inside the storage space and including a valve that opens to allow depressurization of the removable container or bag during the evacuation event.

21. The apparatus according to claim 20, further comprising a vacuum sensor connected to the modular unit, the vacuum means and the control panel to control, monitor and indicate a level of vacuum inside the modular storage unit.

22. A method of sealing a container in a vacuum system for storing, preserving and dispensing perishable and degradable food and goods comprising:
    a) providing a modular unit having a sealable storage space and a slidable drawer to open and close said modular unit;
    b) placing a container into the modular unit to allow a partial vacuum to be created inside of the container when a partial vacuum is created inside of the modular unit;
    c) providing a valve on the container;
    d) actuating a vacuum means in communication with the modular storage unit space to create a partial vacuum environment within the container; and
    e) removing the container from the modular unit.

23. The method according to claim 22, further comprising a control panel constructed for activating the vacuum means to initiate an evacuation event inside the modular unit.

24. A method of sealing a bag in a vacuum system for storing, preserving and dispensing perishable and degradable food and goods comprising:
    a) providing a modular unit having a sealable storage space and a slidable drawer to open and close said modular unit;
    b) placing a bag into the modular unit to allow a partial vacuum to be created inside of the bag when a partial vacuum is created inside of the modular unit;
    c) providing a valve on the bag;
    d) actuating a vacuum means in communication with the modular storage unit space to create a partial vacuum environment within the bag; and
    e) removing the bag from the modular unit.

25. The method according to claim 24, further comprising a control panel constructed for activating the vacuum means to initiate an evacuation event inside the modular unit.

* * * * *